(No Model.)
F. P. CROSBY.
VELOCIPEDE.
No. 501,493. Patented July 18, 1893.
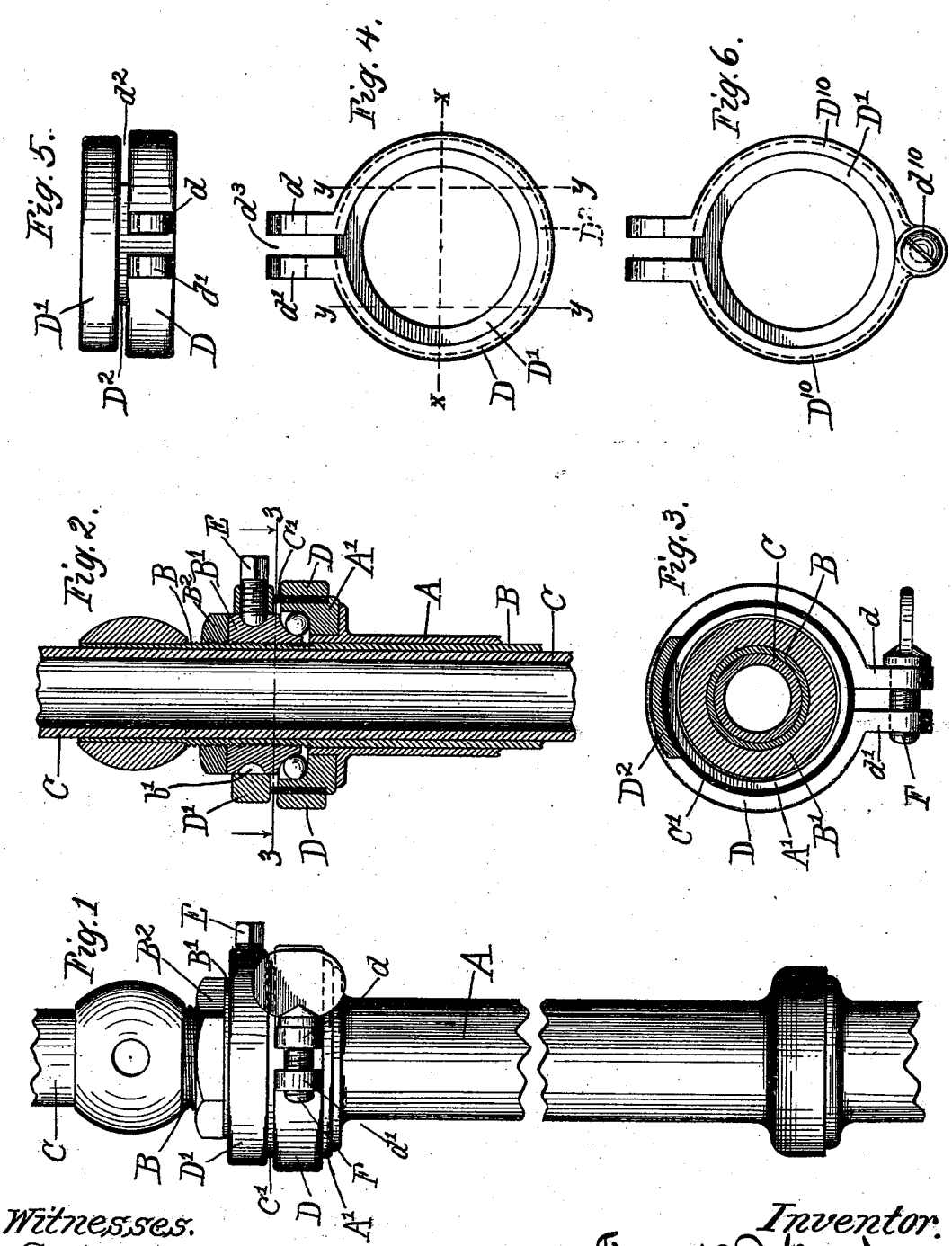
Witnesses.
E. T. Wray
Jean Elliott
Inventor.
Frank P. Crosby
By Burton and Burton
his attys

UNITED STATES PATENT OFFICE.

FRANK P. CROSBY, OF CHICAGO, ILLINOIS.

VELOCIPEDE.

SPECIFICATION forming part of Letters Patent No. 501,493, dated July 18, 1893.

Application filed November 21, 1892. Serial No. 452,672. (No model.)

*To all whom it may concern:*

Be it known that I, FRANK P. CROSBY, a citizen of the United States, residing at Chicago, county of Cook, and State of Illinois, have invented certain new and useful Improvements in Velocipedes, which are fully set forth in the following specification, reference being had to the accompanying drawings, forming a part thereof.

The purpose of this invention is to provide means which may be under the easy control of the rider of a velocipede for stiffening or relaxing the steering joint, or joint between the main frame and the steering wheel spindle or head, so that the wheel may be set to run straight or in any desired curve, or may be left free to be under the sole control of the handle bar with the usual desired easy action at the steering joint, or may be moderately tightened to prevent wabbling and relieve the rider of the necessity for the extreme attention to steering which is necessary under many situations,—such as attempting to follow a car track or in riding over cobble stone pavement.

In the drawings,—Figure 1 is a front side elevation of a steering head embodying my invention, the form of steering head being that in which ball bearings are employed to prevent the friction of the joint. Fig. 2 is a transverse axial section through the same steering head. Fig. 3 is a horizontal section at the line 3—3 on Fig. 2. Fig. 4 is a plan, and Fig. 5, an edge elevation of a collar which is peculiar to my invention. Fig. 6 is a plan of a modified form of an equivalent device.

My invention is not limited to its application to steering heads having ball-bearings, but certain specific features of its application to a ball-bearing head will be described and claimed in addition to the general features by which its applicability and mode of applying it to other sorts of steering heads may be understood.

A represents the vertical head of the frame of a velocipede of familiar construction having ball-bearings at the upper and lower end for the steering spindle or stem of the steering wheel fork or frame, represented by the tubular portion B, C being the handle-bar stem which is inserted down into the tubular spindle of the steering wheel frame or fork.

The device which is peculiar to my invention in its application to a ball-bearing steering head may be applied in connection with either of the bearings, but more conveniently the upper bearing, and I have so illustrated it, and the lower bearing, therefore, needs no further reference or description.

A' is the ball seat or member of the ball-case of the upper bearing which pertains to the steering head.

B' is the cone or member of the ball-case which pertains to the steering spindle B.

B² is the jam nut by which the cone is secured on the spindle after the cone has been properly set to make the ball-bearing suitably close. Obviously, the steering joint might be tightened by tightening the ball-bearings, but this would not only injure the latter and rapidly deteriorate them by flattening the balls or denting the case, or both, but it would also be impracticable for the purposes for which the stiffening of the joint is desirable, since, for that purpose the change from an easy action to a stiff action, or to a positively fixed relation between the parts of the steering joint, and vice versa, needs to be made almost instantaneously, without dismounting, according to the change of circumstances, and the character of the road over which the rider is passing; and such prompt tightening and relaxing of the ball-bearing joints is not consistent with a secure joint, nor with such accuracy in its adjustment as is desirable and is the chief purpose of employing the ball-bearing. The same would be true of other forms of anti-friction or light friction bearings for steering heads. In order, therefore, to accomplish the purpose of this invention, I provide an additional bearing between the parts, besides the ordinary bearing, and independent thereof to the extent that the latter is unaffected by the adjustment of the former; and this additional bearing, I construct in such manner that it can be tightened or slackened at will, and may be set tight enough to bind the two parts of the steering joint rigidly without imposing any additional friction or pressure upon the ordinary joint which receives the weight and friction in the ordinary action of the machine. I prefer to make this additional bearing by means of a split collar D, constituting a clamp which encircles one part of the steering joint and is adapted to be clamped thereto more or less tightly, said collar having an extension which is secured to the other member of the joint, so that the rotation of the member to which it is secured with respect to the other member, causes friction between the collar which clamps the other member and said member, varying in degree according to the tightness with which the collar is thus clamped into the other member.

In the preferred form illustrated, shown in Figs. 1 to 5 inclusive, the extension of the collar D is in the form of a ring or collar D', which is made integral with the collar D, being connected thereto by the neck or stem $D^2$, said ring or collar D' being provided with a set screw E, by which it is adapted to be secured rigidly to one member of the steering joint. It is most convenient, and for some reasons otherwise desirable, that the split collar D should be clamped about the member of the ball-case which pertains to the steering head A, and I have so illustrated it. And it is likewise convenient that the corresponding member of the ball-case, pertaining to the steering spindle B, should afford the means of securing the ring D to the steering spindle, and I have illustrated that construction. A thumb screw F, set through the two lugs $d\ d'$ of the split collar D, constitutes the means for clamping said collar more or less firmly about the member A' of the ball-case, and for convenience of the rider in adjusting the pressure or grasp of the collar according to the degree of friction which he desires to produce, the thumb screw should stand either at the front or at the rear of the head when the wheel is traveling in a direct line. It will then not vary much from the direct front or rear position in any ordinary circumstance under which it will be necessary to reach it. This position will be secured by setting the ring D' on the member B' of the ball-case. But inasmuch as the cone B' in the adjustment which will be made of it to take up lost motion in the ball-bearings may be rotated more or less, it is necessary to re-adjust the collar D' circumferentially about the cone B', after each adjustment of the latter, and in order that this may be done without in any manner mutilating the cone, I prefer to form in the latter a peripheral groove $b'$, and to make the end of the set screw E conform to the cross-section of that groove, so that it may take into the latter and be readily set tight therein at any point. The collar D' and the set screw E projecting radially therefrom will constitute a convenient means for operating the cone in the adjustment of the latter on the spindle, and thereby compensate for the loss of means for applying a wrench to the cone which results from making the latter circular to afford a seat for the collar. Both for the purpose of providing suitable friction surface between the collar D and the member A' of the ball-case, and to serve as a dust-guard, I provide the leather sleeve C', encircling the member A' of the ball-case between it and the collar D, and protruding upward beyond the upper surface of the member A' of the ball-case to the under surface of the ring or collar D'.

The most desirable form which I have devised for the device which distinguishes this invention as applied to a ball-bearing head, is that which is illustrated in detail in Figs. 4 and 5, wherein the split collar D and the ring or collar D' are integral. I form them in one piece out of a forging first made in the general outline of the two consolidated parts, as seen in the drawings, and rifted at $d^3$ between the lugs $d\ d'$, and then, by a saw cut at $d^2$, between the two collars D and D', cutting to the dotted line $x$—$x$, and finishing the rift by saw cuts from opposite sides to the dotted lines $y$—$y$, respectively, thus leaving standing the stem or neck $D^2$. In lieu of this construction, that shown in Fig. 6 may be employed, the split collar being made in two parts $D^{10}\ D^{10}$, pivoted together on a screw $d^{10}$, which is set into the collar D', projecting parallel to the axis across the interval between the collars D and D'.

The action of the two devices will be understood as substantially identical, the first described being cheaper of construction.

I claim—

1. In combination, substantially as set forth, the two parts of the steering joint having two independent bearings upon each other, one of said bearings being adapted to be tightened to increase the friction between said parts at will without affecting the other bearing.

2. In combination, substantially as set forth, the two parts of a steering joint having two bearings upon each other, each of said bearings being adapted to be adjusted independently of the other, whereby one may be tightened to increase the friction between its parts while the other is left free.

3. In a velocipede, in combination with the steering head and the steering spindle having anti-friction bearings between them, a frictional bearing between said parts independent of the anti-friction bearing and adapted to be tightened at will to increase its friction: substantially as set forth.

4. In a velocipede, in combination with the two parts of the steering joint provided with anti-friction bearings and means for adjustment in the direction of the axis of the joint to compensate for lost motion in said bearings; a friction bearing between said parts of the joint and means for adjusting the same transversely to the axis to increase its friction, whereby such adjustment is made without effect upon the anti-friction bearings: substantially as set forth.

5. In a velocipede, in combination with the steering head and the steering spindle having ball bearings between them, two rings or collars encircling and adapted to be clamped respectively to the two members of the ball-case, said collars being rigidly connected, one of said collars being split, whereby it is adapted to be clamped more or less tightly about the member which it encircles: substantially as set forth.

6. In a velocipede, in combination with the steering head and spindle, the two members of the ball-bearing case rigid with said parts respectively, the two rings or collars encircling and adapted to be clamped to said members of the ball-case respectively; one of said collars being split and adapted to be more or less tightly clamped to the part which it encircles, the other ring encircling the adjustable member of the ball-case and being adjustably secured thereabout: substantially as set forth.

7. In combination with the steering head and the member of the ball-case rigid therewith, the steering spindle having the adjustable member of the ball-case; a split collar D encircling and adapted to be clamped to the member of the ball-case on the head, and the collar D' encircling and adapted to be adjustably secured to the adjustable member of the ball-case: substantially as set forth.

8. In combination with the steering head and the steering spindle and the members of the ball-case on them respectively, the dust-guard and friction sleeve D encircling one of said members of the ball-case; the split collar encircling and adapted to be clamped about said member outside of said friction sleeve, and the collar D' rigid with the collar D, adapted to be secured rigidly to the other member of the ball-case: substantially as set forth.

In testimony whereof I have hereunto set my hand, in the presence of two witnesses, at Chicago, Cook county, Illinois, this 14th day of November, 1892.

FRANK P. CROSBY.

Witnesses:
 CHAS. S. BURTON,
 JEAN ELLIOTT.